May 4, 1948.　　　M. N. YARDENY　　　2,440,838
REMOTE POSITION CONTROL SYSTEM
Filed April 18, 1941
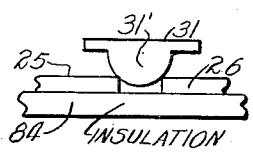
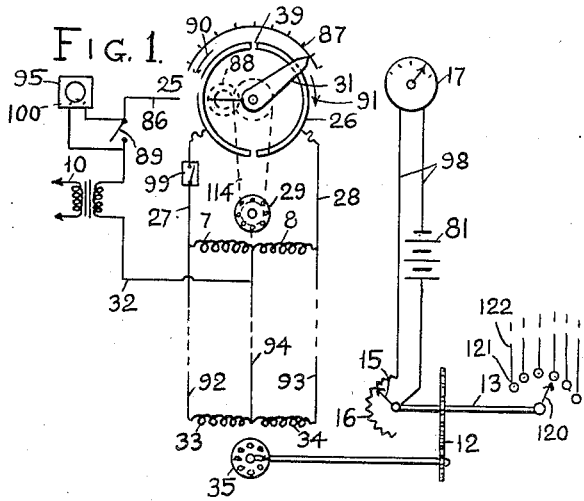
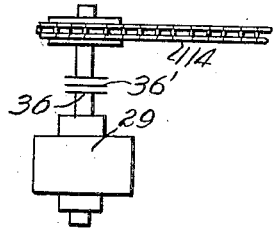
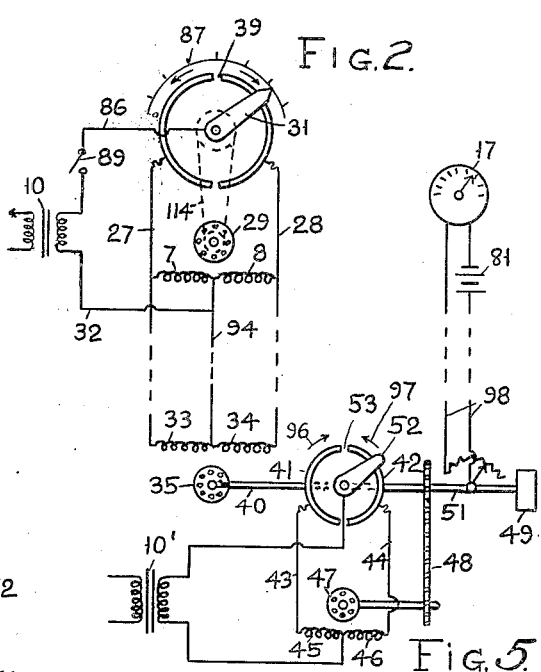
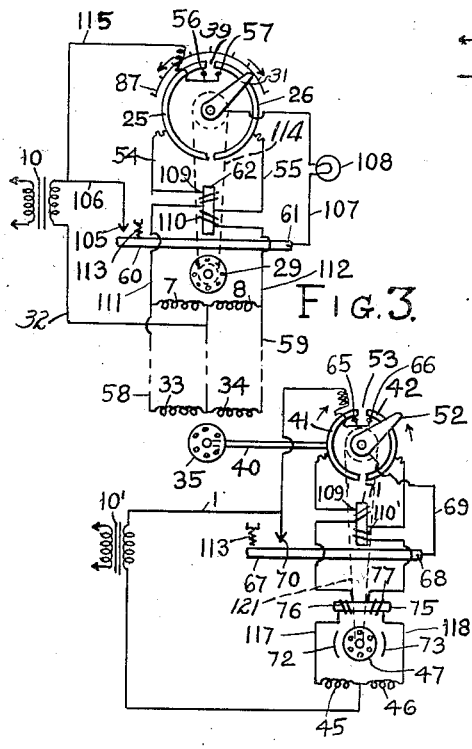
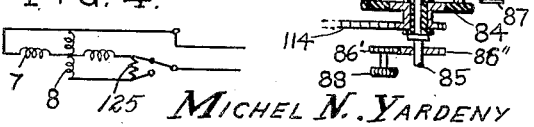
MICHEL N. YARDENY
INVENTOR.
BY John P. Nissonow
ATTORNEY Patented May 4, 1948

2,440,838

UNITED STATES PATENT OFFICE 2,440,838

REMOTE POSITION CONTROL SYSTEM

Michel N. Yardeny, New York, N. Y.

Application April 18, 1941, Serial No. 389,162

5 Claims. (Cl. 318—31)

My invention relates to remote control systems or apparatus and has particular reference to electric control devices.

My invention has for its object to provide a system for controlling an electric motor at a distance so as to obtain a desired degree of movement of a controlled device operated by the motor. I prefer to use for this purpose a squirrel cage induction motor having two reversing windings so that it can be made to rotate in either direction and, when both windings are energized, can be instantly stopped by the opposing electromotive forces.

In my arrangement I employ a device simultaneously controlling two or more motors, one motor being at a transmitting station, the other motor or motors being at the receiving station, all these motors being arranged to operate at the same time.

In another modification I employ transmitting and receiving motors of about the same size, the receiving motor being used to control the rotation of a larger motor so as to move the controlled member to a distance indicated by the controlling devices.

My invention is more fully described in the accompanying specification and shown in the drawings, in which:

Fig. 1 is a diagram of a system embodying the invention in one of its forms;

Fig. 2 is a diagram of a similar system in which the receiving motor is used to control rotation of a larger motor;

Fig. 3 is a diagram of connections of a similar system employing transmitting and receiving motors with relays for disconnecting the current when the motors are stopped and with supplementary magnetic brakes;

Fig. 4 is a diagrammatic view of windings of one form of reversible induction motor;

Fig. 5 is a detail view of my control contactor;

Fig. 6 is also a detail view, on a somewhat enlarged scale, looking toward the left in Fig. 5; and Fig. 7 is another detail view, showing a motor and a frictional coupling interposed in a transmission.

In one embodiment of my device shown in Figs. 1 and 5, a control device is used comprising a disc 84 rotatively mounted on a shaft 85 and having conducting sectors 25 and 26 insulated from the disc. The sectors are connected by leads 27, 28 with reversing windings 7, 8 of a controlling motor 29, preferably of an induction type with short circuited or squirrel cage secondary. Fig. 4 is a diagrammatic showing of the field windings of a standard type reversible induction motor, the field windings including a dephasing resistor 125 for causing creation of a rotation magnetic field for starting rotation of the motor in one direction or the other when one or the other of the windings 7, 8 is energized. The disc is rotated by the motor through a chain drive 114. The field windings 7, 8 may be connected at their point of junction with one terminal of the source of current 10 by a lead 32. If the induction motor is of a common type having a third or reactive winding, such winding may of course be connected in series with the common lead wire 32, in accord with well-known practice for such types of motors. The other power terminal is connected by a lead 86 with a contact arm 31 rigidly mounted on the shaft 85 and sliding over the sectors 25, 26. The arm can be turned into any desired position, the latter being indicated on a stationary scale 86. This operation is facilitated by the provision of reduction gears 86', 87 and a handle 88 (Fig. 5).

A manually operable switch 89 may be provided in the lead 86 in order to avoid any possible sparking at the contacts when the arm 31 is being placed in position. It may be seen that placing of the arm 31 on one of the sectors will close the circuit through a corresponding winding 7 or 8, causing the motor to rotate in a corresponding direction. The windings 7, 8 are connected by leads 92, 93 with the corresponding windings 33, 34 of a second or controlled motor 35, having the same characteristics as the first motor, so that the two motors can rotate in the same direction and concurrently, the middle points of the windings being connected by a common lead 94.

The second motor operates through gears 12 a shaft 13 connected to any suitable driven member or useful load. The shaft 13 also turns a contact arm 15 of a rheostat 16 connected by leads 98 through a source of current 81 with a meter 17, preferably of a voltmeter type, calibrated in any suitable units such as degrees of a circle, etc., the meter being placed at the control point and indicating the angle of movement of the shaft 13 or any other movement performed by the driven member and controlled by the arm 31.

In the operation of the device both motors rotate when the arm 31 is placed on one of the sectors, until the gap 39 moves under the arm 31. The latter is preferably made of such width that it contacts both sectors at the gap, thereby energizing simultaneously both windings 7 and 8. With the types of motors above stated to be preferred for use with this invention, two opposing electromotive forces will be induced, causing both motors instantly to stop. The contacting side of the arm 31 is preferably rounded as shown at 31' in Fig. 6 in order to obtain its instant transfer to one or the other sector as soon as the sectors are moved, also in order to yieldably retain the sectors in the neutral position when the gap is moved under the arm. Additional means may be provided to suppress hunting of the motor when it is suddenly stopped. I have found that very good results are obtained when two or more frictional couplings are introduced in the motor shaft 36 or other shafts separated by gearing or similar transmission. One of such couplings, of conventional type, is shown diagrammatically at 36' in Fig. 7 as being interposed in said shaft 36; said shaft 36 being the motor shaft of motor 29.

An automatic switch 100 may be provided instead of the manual switch 89, the automatic switch being operated, for instance, by a clock 95 for closing the circuit at a predetermined time, the sectors being previously placed in a desired position.

In actual operation the motors start as soon as the arm 31 is moved from the gap, and the gap 39 then follows the arm until the latter is stopped.

The controlled shaft 13 can be used for operating various devices where precision of movement is required, such as a contactor arm 120 engaging contact points 121 connected by wires 122 with any mechanism or signal devices.

In certain applications of my system it may be necessary to operate at a distance heavy objects such as guns, in which case relatively large controlled motors must be employed, which may not follow synchronously the movements of the controlling motor 29. The motor 35, as shown in Fig. 2, is operatively connected by a shaft 40 with control sectors 41, 42, connected by flexible leads 43 and 44 with the reversing windings 45 and 46 of a service motor 47 operating through a transmission 48 an object 49, such as a gun, rudder of a boat, etc. The motor 47 may be energized from a separate source of current 10'. A transmission shaft 51 operates a contact arm 52 sliding over the sectors 41, 42. The arm 52 may rotate through the same angle as the control arm 31, so that the motor 47 stops when the arm 52 bridges the gap 53 between the sectors, at the same moment as the arm 31 bridges the gap 39. Motor 35 turns the sectors in directions according to arrows 96, 97.

It is evident that the motor 47 need not have the same rate of rotation as the motors 29, 35, its object being only to supply driving power to the load and to bring the arm 52 into the correct required position, regardless of the time required for this operation.

In a modified arrangement shown in Fig. 3, provision is made to disconnect the circuit when the motors are stopped. The sectors 25, 26 in this case are connected to the windings 7, 8 of motor 29 by leads 54, 55 and to the windings 33, 34 of the motor 35 by leads 58, 59.

The circuit for the system is closed by a contact bar or relay 60 pivoted at 61 and attracted by a magnet 62 for closing a contact point 105 at the end of a lead 106 extending from one end of the source of current 10, the other end of the bar 60 being connected to the arm 31 by a lead 107. A signal lamp 108 may be included in this circuit. The relay magnet 62 has two coils 109, 110 wound in opposite directions and connected with the corresponding windings 7, 8 of motor 29 by leads 111, 112. A spring 113 urges the bar 60 away from the magnet 62. With this arrangement the magnet is magnetized only when one of the coils 109, 110 is energized, but is demagnetized when both coils are energized. The circuit now being described, since it includes contact point 105 and lead 106, is therefore opened and the current stopped when the arm 31 bridges the gap 39. The relay magnet should preferably have a certain time lag in order to allow the motors to stop before the current is interrupted. Thus if the contactor 31 engages the sector 26 as shown, current will flow through the relay coil 110, winding 8 of the motor 29, and winding 34 of the motor 35, causing both motors to rotate as soon as the relay contact point 105 is engaged by the armature 60. Rotation will continue until the gap 39 is bridged by the contactor 31 when the other relay winding 109 will be also energized, demagnetizing the relay and disconnecting the circuit. Due to a certain delay in the relay action, the motors will be stopped by the opposing electromotive forces when both reversing windings are energized.

Additional contact points 56, 57 are provided on the disc 84 (Fig. 5) at the ends of the gap 39. It will be noted that in the circuit here shown, the coils 109, 110 are in series with the reversing windings of the motors, and that such series circuit is opened at the contact point 105 when the relay 62 is demagnetized by energization of both these coils. Hence a restarting circuit is here provided. The points 56, 57 are so spaced apart that the arm cannot connect them together. They are close to the gap, so that the restarting circuit is closed through one of these points and a lead 115 as soon as the arm 31 is moved out of the neutral position. Thus, when it is desired to restart the motors for operation in one direction or the other, and when accordingly the arm 31 is moved into engagement with a sector 25 or 26, the arm will engage both the selected sector and the associated contact 56 or 57. Then the restarting circuit will be closed; this circuit including current source 10, lead 115, contact 56 or 57, arm 31, sector 25 or 26, lead 54 or 55, coil 109 or 110, leads 111, 58 or 112, 59, reversing windings 7, 33 or 8, 34 of motors 29, 35, and lead 32 back to the current source. At the instant this circuit is established, the accompanying energization of coil 109 or 110 energizes magnet 62 to attract contact 60 thereby to restore the circuit including lead 106 and contact point 105. This restored circuit, as will be understood, is not dependent for its maintenance on continued engagement of the contact arm 31 with a contact 56 or 57 as well as with a sector 25 or 26; and so the circuit will be maintained during relative movement between the arm 31 and the sector 25 or 26 after the arm 31 breaks engagement with contact 56 or 57, and until the arm and gap 39 are again brought into registration.

The motor 35 may be used to control the operation of a power motor as at 47 in Fig. 3, if desired, the same as motor 47 is controlled by motor 35 in Fig. 2, or by a somewhat different arrangement hereinafter described and as shown in the lower part of Fig. 3.

A disconnecting relay is provided for the service or power motor 47, consisting of a closing bar 67 pivoted at 68 and connected with the arm 52 by a lead 69. The relay coils are connected to starting contact points 65, 66 at the gap 53. The current is interrupted at 70 when the arm 52 bridges the gap 53, by a magnet 71 with oppositely wound coils, 109', 110'.

Magnetic automatic brakes may be provided for more effective stopping of the motors, particularly when they operate more or less large inertia masses. The brake shoes 72, 73 for the motor 47 are held tightened against a pulley on the motor shaft by a suitable spring and are released by a magnet 75. The magnet has energizing coils 76, 77 wound in the opposite directions and connected with the corresponding reversing field windings 45, 46 by leads 117, 118. The magnet is magnetized when one of the coils is energized, releasing the brake, but is demagnetized when the arm 52 bridges the gap 53. In other respect the operation of this system is similar to the operation of the system of Fig. 2.

Connections for the reversing windings of the motors according to one possible example are shown diagrammatically in Fig. 4.

The best results are obtained with my system, as explained above, when special motors are used in which opposing electromotive forces oppose each other if both reversing windings are simultaneously energized. My system can be also used with ordinary motors in which the field is merely demagnetized under such conditions, the motor stopping for the lack of rotating field.

It is understood that my remote control system may be further modified without departing from the spirit of the invention, as set forth in the appended claims.

I claim as my invention:

1. An electrical control apparatus of the follow-up type for placing a useful load in any desired position comprising a pair of independently movable electrically conductive control elements, one element comprising conducting means having a neutral point and the other element comprising a contactor for engaging the conducting means; a drive means for moving one element, the other element being otherwise movable; a load motor; circuit means to control the direction of operation of the drive means and of the motor by the position of the contactor relative to the neutral point; relay means having a pair of coils included in said circuit means, one or the other of said coils being arranged to be energized according as the contactor engages the conducting means at one side or the other of the neutral point and both coils being arranged to be energized by the contactor engaging the neutral point; contact means also included in said circuit means and controlled by said relay means for rendering the drive means operative for moving one of the elements, and for energizing the motor in response to one of the coils being energized and for rendering the drive means inoperative for the purposes aforesaid and for deenergizing the motor in response to both coils being energized; and a pair of supplementary contacts engageable by the contactor included in a second circuit means for energizing one or the other of the relay coils in response to the contactor engaging one of the supplementary contacts, thereby energizing said second circuit means for the purposes aforesaid.

2. An electrical control apparatus as in claim 1, wherein said supplementary contacts are so positioned relative to the conducting means as to permit either of said contacts and a corresponding portion of the conducting means at one or the other side of the neutral point to be bridged by the contactor.

3. An electrical control apparatus as in claim 1, wherein the motor has two reversing windings, and wherein one of said coils is in series connection with one winding of the motor and the other of said coils is in series connection with the other winding of the motor.

4. An electrical control apparatus of the follow-up type for placing a useful load in any desired position, comprising two independently movable electrically conductive control elements, one element comprising conducting members separated by a gap and the other element comprising a contact member for engaging the conducting members and arranged to bridge the gap; drive means including a motor having reversing windings for moving one of the elements, the other element being otherwise movable; a second drive means including a motor having reversing windings and arranged to operate the useful load; and circuit means connecting each of the conducting members with one of the windings of each motor to control the direction of rotation of the motors by energizing one or the other winding of each motor in response to the contact member being in engagement with one conducting member or the other and to energize both windings of each motor in response to the contact member bridging the gap, the motors being arranged to be positively stopped by energizing both windings of each motor, relay means included in said circuit means and connected to disconnect the circuit means for de-energizing both the motors, after both windings of each motor are energized; and a pair of supplementary contacts engageable by the contact member included in a second circuit means for energizing one or the other of the motor windings in response to the contactor engaging one of the supplementary contacts, thereby energizing said second circuit means for the purposes aforesaid.

5. An electrical control apparatus of the follow-up type for placing a useful load in any desired position comprising a pair of control elements, one element comprising conducting members separated by a gap and the other element comprising a contact member for engaging the conducting members and arranged to bridge the gap; drive means including a control motor having reversing windings for moving one of the elements, the other element being otherwise movable; a single phase reversible induction motor having two reversing field windings and dephasing resistance means for moving the load; and circuit means associated with the control elements for selectively energizing one of the control motor windings and one of the load motor windings, the thus energized load motor winding being connected directly with a source of current while the other load motor winding is energized through the resistance means according as there is engagement between the contact member and one or the other of the conducting members, thereby causing both motors to rotate in one direction or the other, and for connecting both windings of each motor directly with the source of current when the gap is bridged for simultaneously energizing both windings of each motor, thereby causing the load motor to be braked by the resulting stationary alternating field when the contact member bridges the gap.

MICHEL N. YARDENY.

REFERENCES CITED

The following references are of record in the file of this patent:

UNITED STATES PATENTS

| Number | Name | Date |
|---|---|---|
| 713,258 | Weston et al. | Nov. 11, 1902 |
| 1,116,407 | Friedrick | Nov. 10, 1914 |
| 1,508,796 | Kaminski | Sept. 16, 1924 |
| 1,614,192 | Ewald | Jan. 11, 1927 |
| 1,850,780 | Sperry | Mar. 22, 1932 |
| 1,853,506 | Carter | Apr. 12, 1932 |
| 1,905,503 | Roberton | Apr. 25, 1933 |
| 1,971,130 | Chubb | Aug. 21, 1934 |
| 2,113,197 | Lang | Apr. 5, 1938 |
| 2,120,951 | Hodgman | June 14, 1938 |
| 2,223,666 | Harrison | Dec. 3, 1940 |
| 2,228,199 | Chance | Jan. 7, 1941 |

FOREIGN PATENTS

| Number | Country | Date |
|---|---|---|
| 127,755 | Germany | Jan. 29, 1902 |
| 264,401 | Germany | Sept. 24, 1913 |
| 367,560 | France | Sept. 6, 1906 |
| 466,281 | Great Britain | May 26, 1937 |